United States Patent
Warren et al.

(10) Patent No.: US 12,467,376 B1
(45) Date of Patent: Nov. 11, 2025

(54) BLADE TIP CLEARANCE PROBE/LEAD COOLING JACKET

(71) Applicant: RTX Corporation, Farmington, CT (US)

(72) Inventors: Eli Warren, Wethersfield, CT (US); Bryan James Hackett, Berlin, CT (US); Patrick M. Harrington, Palm Beach Gardens, FL (US); Hunter Tomick, Lebanon, CT (US); Edward F. Dreger, Burlington, CT (US); Charles W. Haldeman, Simsbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/793,614

(22) Filed: Aug. 2, 2024

(51) Int. Cl.
| | |
|---|---|
| *F01D 11/18* | (2006.01) |
| *F01D 11/24* | (2006.01) |
| *F01D 21/00* | (2006.01) |
| *F01D 25/12* | (2006.01) |
| *G01B 5/14* | (2006.01) |
| *G01B 7/02* | (2006.01) |
| *G01B 7/14* | (2006.01) |
| *G01M 15/14* | (2006.01) |

(52) U.S. Cl.
CPC .............. *F01D 11/18* (2013.01); *F01D 11/24* (2013.01); *F01D 21/003* (2013.01); *F01D 25/12* (2013.01); *G01B 5/14* (2013.01); *G01B 7/023* (2013.01); *G01B 7/14* (2013.01); *G01M 15/14* (2013.01); *F05D 2220/32* (2013.01); *F05D 2240/55* (2013.01); *F05D 2260/20* (2013.01); *F05D 2260/80* (2013.01); *F05D 2260/83* (2013.01); *F05D 2270/821* (2013.01)

(58) Field of Classification Search
CPC ............ F01D 21/003; F05D 2270/821; F05D 2260/83; G01B 7/14; G01B 5/14; G01B 7/023; G01M 15/14
See application file for complete search history.

(56) References Cited

U.S. PATENT DOCUMENTS

| | | | |
|---|---|---|---|
| 5,649,369 A | 7/1997 | Thoren | |
| 5,931,712 A * | 8/1999 | Hattori | B63H 21/32 440/89 C |
| 9,778,145 B2 | 10/2017 | Walling | |
| 10,533,899 B2 | 1/2020 | Rudkin | |
| 11,506,080 B2 | 11/2022 | Lefebvre et al. | |
| 2022/0243615 A1* | 8/2022 | Turcotte | F02C 7/24 |

FOREIGN PATENT DOCUMENTS

DE 19725612 A1 * 1/1999

OTHER PUBLICATIONS

English machine translation of DE-19725612-A1, Mar. 20, 2025.*

* cited by examiner

Primary Examiner — Christopher Verdier (57) ABSTRACT

A lead cooling assembly includes a cooling jacket including a tubular section having an exterior portion and an interior portion, where the interior portion is proportioned to surround a probe lead and provide space for a flow of a gaseous coolant. The lead cooling assembly also includes an intake configured to admit the gaseous coolant into the interior portion of the cooling jacket. The lead cooling assembly further includes a collar configured to fit over the exterior portion of the cooling jacket, where the collar includes one or more exit holes configured to pass the gaseous coolant out of the interior portion of the cooling jacket.

18 Claims, 9 Drawing Sheets

BLADE TIP CLEARANCE PROBE/LEAD COOLING JACKET

TECHNICAL FIELD

This disclosure relates generally to gas turbines. More specifically, this disclosure relates to a cooling jacket for a blade tip clearance probe and leads for blade tip clearance probes.

BACKGROUND

Industry-wide design trends for gas turbine engines have heightened focus on fuel efficiency and optimizing overall system performance and have spurred the desire for real-time data of operating parameters of all stages of gas turbine engines, as well as sensors for obtaining the same. Blade tip clearance, or the distance between the tip of a turbine blade and an outer air seal, is correlative of turbine efficiency and performance and acts as a leading indicator of present or imminent fault conditions with a turbine. As such, obtaining accurate real-time blade tip clearance data can be of paramount importance to ensuring optimum operation of a gas turbine engine.

SUMMARY

This disclosure relates to a cooling jacket for a blade tip clearance probe and leads for blade tip clearance probes.

In a first example, a lead cooling assembly includes a cooling jacket including a tubular section having an exterior portion and an interior portion, where the interior portion is proportioned to surround a probe lead and provide space for a flow of a gaseous coolant. The lead cooling assembly also includes an intake configured to admit the gaseous coolant into the interior portion of the cooling jacket. The lead cooling assembly further includes a collar configured to fit over the exterior portion of the cooling jacket, where the collar includes one or more exit holes configured to pass the gaseous coolant out of the interior portion of the cooling jacket.

In a second example, an apparatus includes a sensor including a probe body and a probe lead connected to the probe body and configured to pass a signal generated in the probe body. The apparatus also includes a cooling jacket including a tubular section having an exterior portion and an interior portion, where the interior portion surrounds the probe lead and provides space for a flow of a gaseous coolant. The apparatus further includes an intake configured to admit the gaseous coolant into the interior portion of the cooling jacket. In addition, the apparatus includes a collar configured to fit over the exterior portion of the cooling jacket and connect to the probe body, where the collar includes one or more exit holes configured to pass the gaseous coolant out of the interior portion of the cooling jacket.

Any single one or any combination of the following features may be used with the examples above. The gaseous coolant may include at least one of compressed air or gaseous nitrogen. The collar may attach to a probe body by one or more of a brazed joint or a tack weld. The collar may be configured to attach to a side mount probe lead. The collar may be configured to attach to a back mount probe lead. The lead cooling assembly may include an insulated offset collar surrounding a section of the exterior portion of the cooling jacket, and the insulated offset collar may prevent one or more of a blade outer air seal (BOAS) rail or tack strap attached to a BOAS rail from directly contacting the cooling jacket. The lead cooling assembly may include a backside cover, and the backside cover may attach to a backside of a probe body to define a cooling chamber between the backside cover and the backside of the probe body. The gaseous coolant may enter the cooling chamber from the one or more exit holes in the collar, and the gaseous coolant may exit the cooling chamber via one or more exit ports. The exit ports may include gaps between tack welds attaching the backside cover to the backside of the probe body. The collar may be integral with the backside cover, and the exit ports may include holes formed in the backside cover. The lead cooling assembly may include a thermal spacer configured to surround a portion of the probe body and reduce contact between the probe body and a BOAS.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1A through 4B, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, industry-wide design trends for gas turbine engines have heightened focus on fuel efficiency and optimizing overall system performance and have spurred the desire for real-time data of operating parameters of all stages of gas turbine engines, as well as sensors for obtaining the same. Blade tip clearance, or the distance between the tip of a turbine blade and an outer air seal, is correlative of turbine efficiency and performance and acts as a leading indicator of present or imminent fault conditions with a turbine. As such, obtaining accurate real-time blade tip clearance data can be of paramount importance to ensuring optimum operation of a gas turbine engine.

Blade tip clearance ("BTC") sensors come in a variety of types, such as eddy current sensors, inductive sensors, and tip-timing sensors, and can obtain blade tip clearance data based on a variety of measured parameters. Each sensor type offers its own portfolio of tradeoffs between performance and durability. Capacitive blade tip clearance sensors, which measure the clearance between a blade tip and a sensor based on measured capacitance between one or more electrodes of the sensor and the passing metal turbine blade, for many applications represent the best available choice in that they are accurate and the sensor body (such as the portion facing the turbine blades) handles heat and pressure well.

The success in developing sensor probes whose body portions can withstand the high temperatures (such as ~2100° Fahrenheit) of a combustor stage do not necessarily translate into improved heat resistance in the probe lead, which is both electrically and conductively connected to the probe body. Even if the probe body is, through cooling from cooling air provided within the back of the air seal (BOAS), maintained at survivable temperatures, heat conducted from the probe body to the probe lead can induce hot oxidation in the probe lead and connection between the probe lead and probe body, which over sustained periods can lead to electrical failure in the probe lead. Thus, improving heat management in probe leads and around the connections between the probe body and probe lead remains a source of technical challenges.

Moreover, external pressures have amplified concerns about the efficiency, condition, and performance of gas turbine engines. Blade tip clearance, and in particular BTC in the hot parts of a gas turbine engine, can be an essential metric of system performance and efficiency and is a leading indicator of potential problems with the system, such as blockages. While capacitive sensors excel along many dimensions of performance, the leads connecting the sensor body to other electronics are vulnerable to being damaged through hot oxidation or other modes of failure by sustained exposure to hot gases in the BOAS and through heat conducted from the combustor stage through the sensor probe body.

Figure 1A:
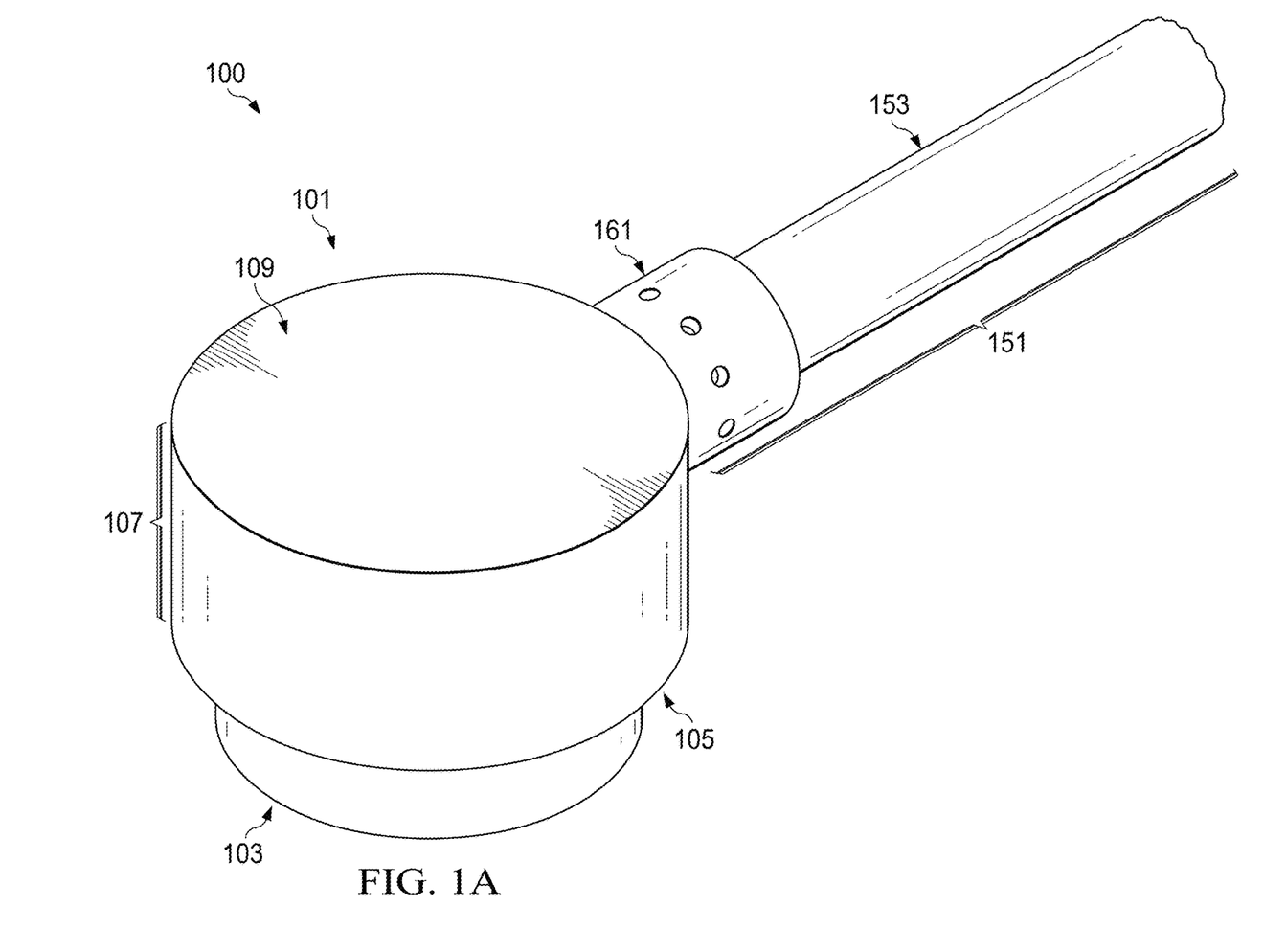
FIGS. 1A-1C illustrate an example of a sensor probe and lead cooling assembly according to this disclosure.
Figure 1B:
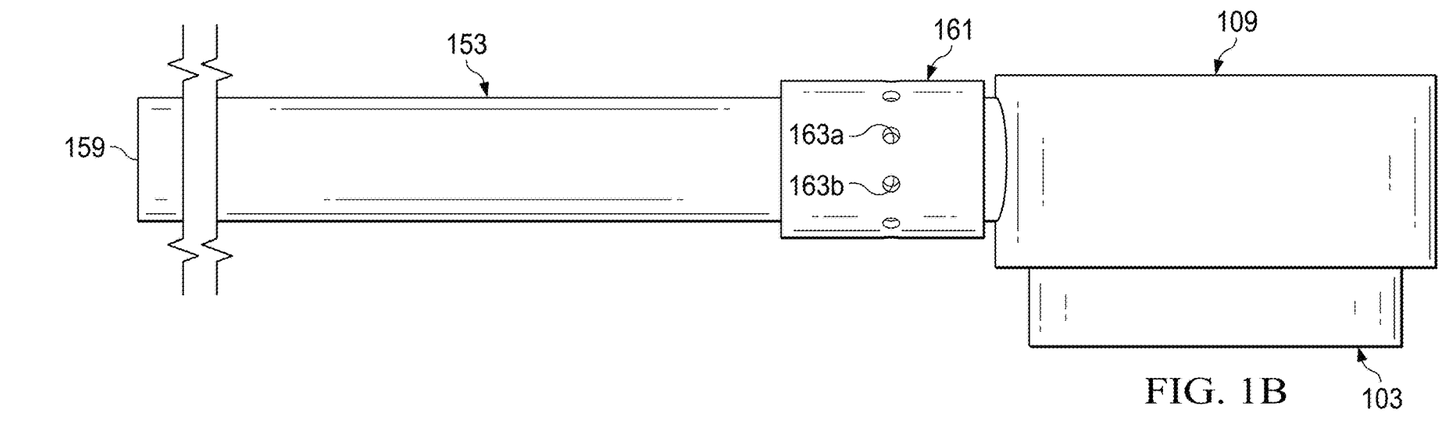
Figure 1C:
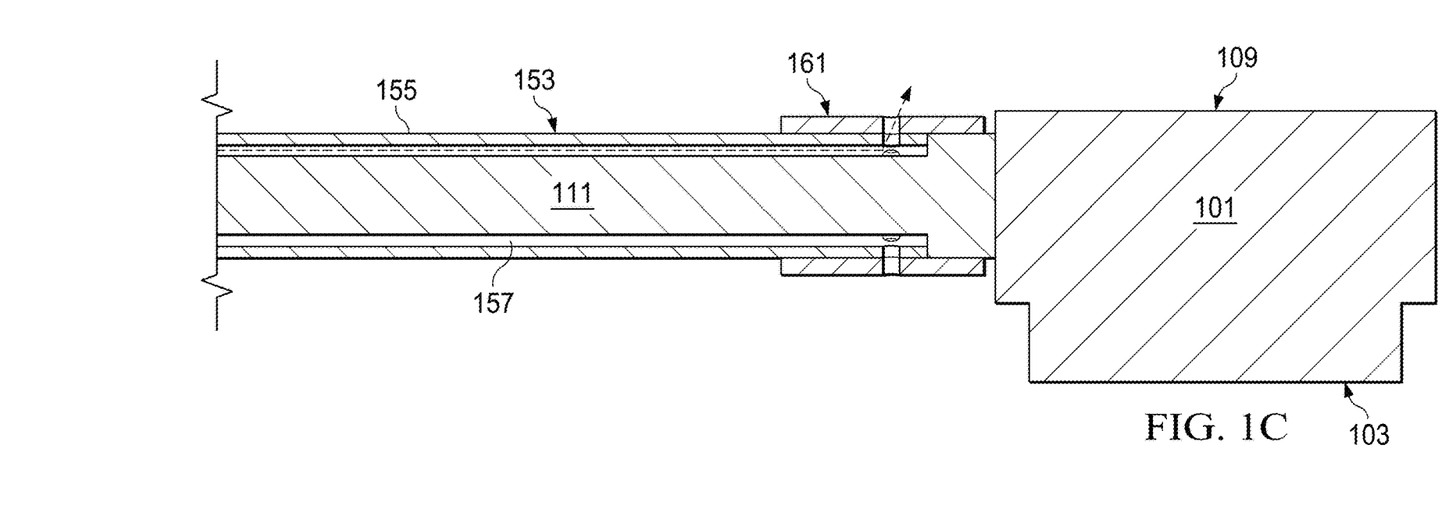

FIGS. 1A-1C illustrate an example apparatus 100 comprising a sensor probe and lead cooling assembly according to this disclosure. For consistency and convenience of cross-reference, elements common to more than one of FIGS. 1A-1C are numbered similarly. Apparatus 100 includes a probe body 101 and a lead cooling assembly 151. In this example, probe body 101 is BTC sensor configured to be installed in a bore in the BOAS of an engine with a sensor face 103 within the hot space of the engine's combustor. Probe body 101 attaches either directly (such as by tack welds or brazes) to the BOAS, or indirectly, to an adapter provided in the BOAS, at points on a lower periphery 105. Sensor face 103 is exposed directly to the high temperatures (such as ~2200° F.) within the combustor stage of the engine. Depending on installation, lower periphery 105 can also be conductively heated through contact with the BOAS.

During operation, sidewall 107 and backside 109 of probe body 101 are disposed in a flow fast-moving compressed air from the compressor stage of the engine. This air is typically at a temperature of ~1600° F., which, though cooler than the temperatures at sensor face 103, is still very hot.

Regardless of the degree of conductive heat transfer from the BOAS, probe body 101 is, during operation of the engine, the temperature of probe body 101 rises, causing heat to be conducted into probe lead 111. Probe lead 111 includes an analog or digital cable interconnect between probe body 101 and diagnostic systems external to the engine. Probe lead 111 can be insulated and armored to survive the temperatures of the fast-moving compressed gas in the space behind the BOAS without further cooling or protection. However, experience and testing have shown that probe lead 111 can experience heat-induced failure (such as due to thermal oxidation) at points at or near where probe lead 111 is in direct contact with other, hotter surfaces. Examples of such conductive contact points include, without limitation, where probe lead 111 connects to probe body 101, or where probe lead 111 is secured to metal rails, tack straps and other surfaces in conductive contact with hot parts of an engine. Put differently, for many existing probe leads, the flow of compressed gas over the lead is not sufficient to avoid failure around localized "hot spots" near points of conductive contact between probe lead 111 and other components.

To mitigate the incidence of heat-induced failure in probe lead 111, certain embodiments according to the present disclosure provide a lead cooling assembly 151, which is configured to slide over, and encapsulate probe lead 111, and provide a space for a gaseous coolant (such as compressed air or compressed nitrogen) to pass over probe lead 111, thereby cooling probe lead 111. As shown in FIGS. 1A-1C, lead cooling assembly 151 includes a cooling jacket 153, which includes a tubular or hollow section of a heat resistant material (such as a nickel steel) providing a flexible conduit for probe lead 111. Further, because the gaseous coolant needs to be provided at a pressure greater than that of the compressed air in the space behind the BOAS, cooling jacket 153 must be made of a material capable of withstanding internal pressures exerted by the pressurized gaseous coolant. Cooling jacket 153 has an exterior portion 155 which is exposed to the flow of compressed air from the compressor stage, and an interior portion 157 whose interior diameter sufficiently exceeds the exterior diameter of probe lead 111 to provide a space for the passage of gaseous coolant over probe lead 111.

Lead cooling assembly 151 further includes an intake 159, including an opening for admitting the gaseous coolant into cooling jacket 153. Lead cooling assembly 151 further includes a collar 161 which is configured to fit over exterior portion 155 of cooling jacket 153. Collar 161 can provide an anchor point between lead cooling assembly 151 and probe body 101, as well as a manifold for regulating the flow of gaseous coolant out of cooling jacket 153. Collar 161 can include one or more exit holes (such as exit holes 163a and 163b) through which gaseous coolant can exit out of cooling jacket 153, as illustrated by the arrow in FIG. 1C. In some embodiments, exit holes 163a and 163b can be drilled after attachment (such as by brazing or tack welding) of collar 161 probe body 101. In this way, the directionality and flow rate (such as it may be desirable to not direct gaseous coolant towards probe face 103 or the backside of a BOAS) of exiting gaseous coolant can be tailored to the requirements of a specific installation. Alternatively or additionally, exit holes 163a and 163b can be predrilled prior to installation. Thus, embodiments according to this disclosure provide the two-pronged technical benefit of providing enhanced cooling to sensor probes and probe leads, while at the same time, ensuring compatibility with existing sensor and sensor probe designs, thereby improving performance, and minimizing retrofitting requirements.

Figure 2A:
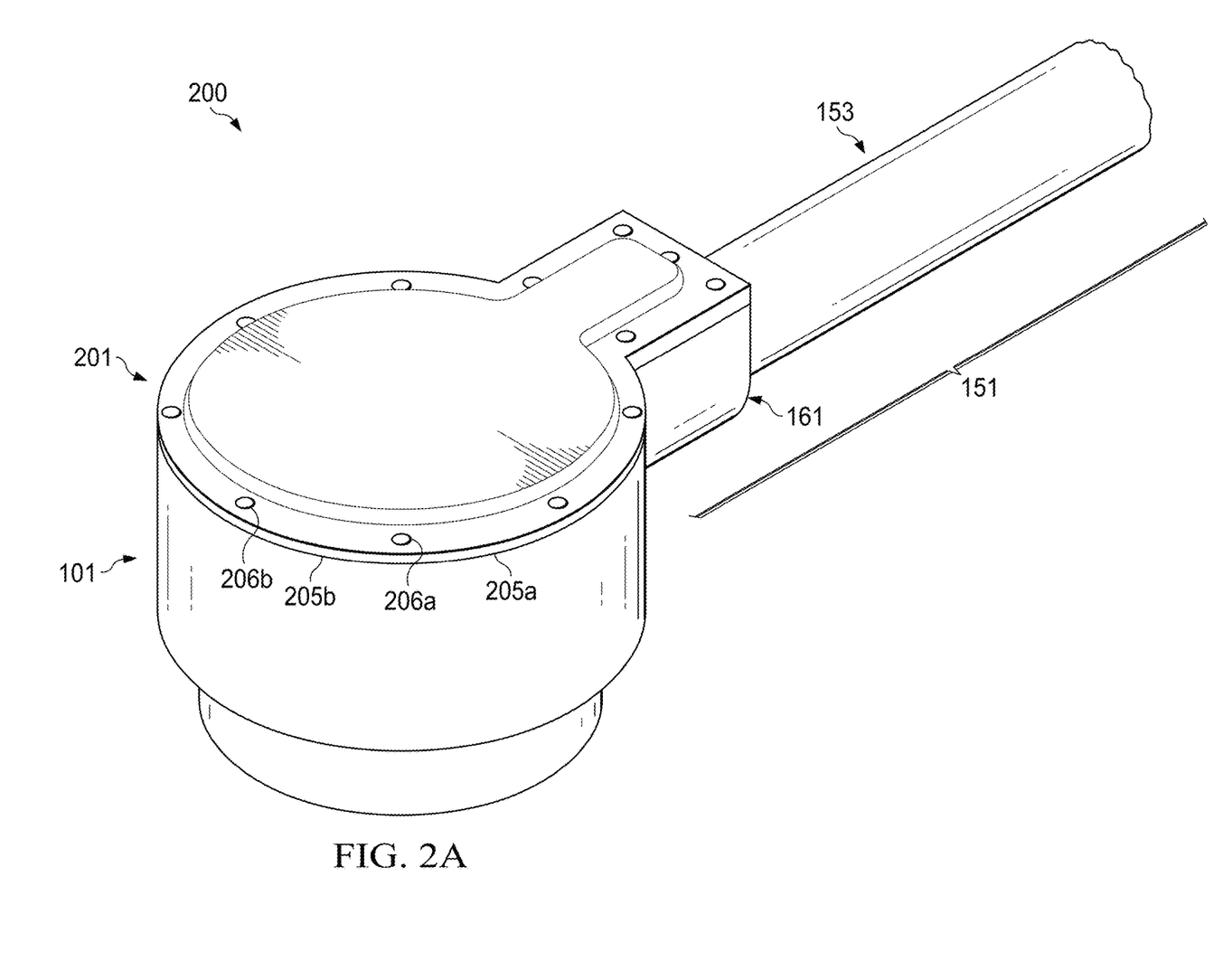
FIGS. 2A-2B illustrate an example of a sensor probe and lead cooling assembly according to this disclosure.
Figure 2B:
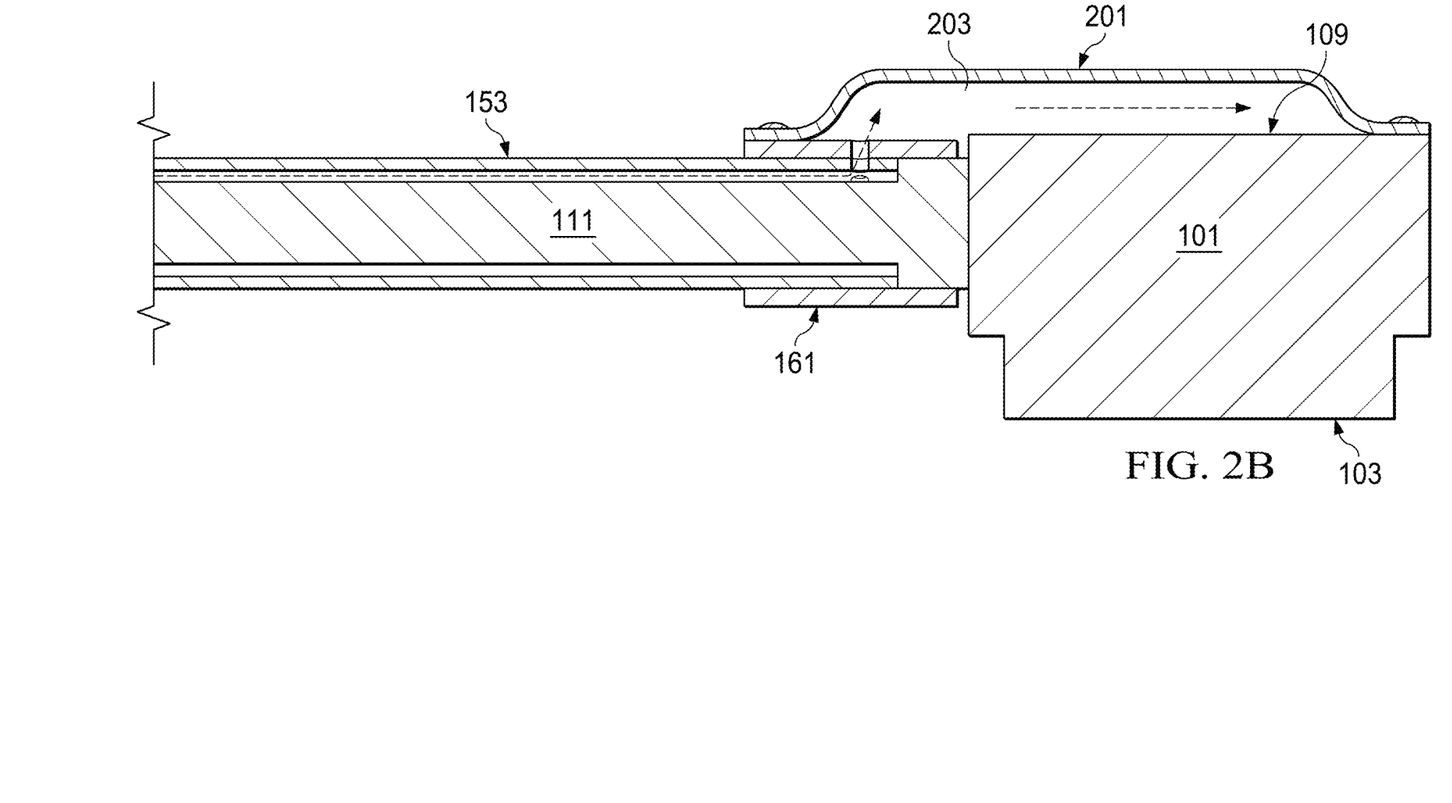

FIGS. 2A-2B illustrate another example apparatus 200 comprising a sensor probe and lead cooling assembly according to embodiments of this disclosure. For consistency and convenience of cross-reference, elements of FIGS. 2A-2B already described with reference to FIGS. 1A-1C are numbered similarly.

Referring to figures, apparatus 200 includes a probe body 101 connected to a probe lead 111 in a side mount configuration, wherein the probe lead is disposed within a lead cooling assembly 151 including a cooling jacket 153 and a collar 161. Example apparatus 200 builds upon apparatus 100 of FIGS. 1A-1C through the addition of a backside cover 201. As described herein, backside cover 201 includes a section of highly heat resistant material (such as a nickel steel) and provides a "hat" to define a cooling chamber 203, through which gaseous coolant exiting cooling jacket 153 can be passed over the backside 109 of probe body. In this way, provided the gaseous coolant is at lower temperature than the fast-moving compressed air in surrounding apparatus 200, heat conducted through probe face 103 can be rejected more readily by the flow of gaseous coolant than by the passing compressed air.

As shown in the figures, in this example, backside cover 201 attaches to both collar 161 and backside 109 of probe body 101. Skilled artisans will appreciate that, to maintain the flow of gaseous coolant, cooling gas needs one or more pathways out of cooling chamber 203. One or more exit ports (such as exit ports 205a and 205b) are provided. In the example of FIGS. 2A and 2B, exit ports 205a and 205b include gaps between tack welds 206a and 206b, wherein tack welds 206a and 206b include members of a set of tack welds attaching backside cover 201 to collar 161 and probe body 101. Because the gaseous coolant is provided under high pressure (such as pressures greater than the ambient pressure of the surrounding compressed gas in the space behind the BOAS), the narrow gaps between tack welds attaching backside cover 201 to probe body 101 work effectively as exit ports. Additionally, or alternatively exit ports can be provided as holes or perforations in backside cover 201. Here again, certain embodiments according to this disclosure provide mechanisms by which the cooling of probe body 101 and probe lead 111 can be enhanced without having to change the underlying design of probe body 101 or probe lead 111, which, from a design and retrofitting perspective, can be very desirable.

Figure 3A:
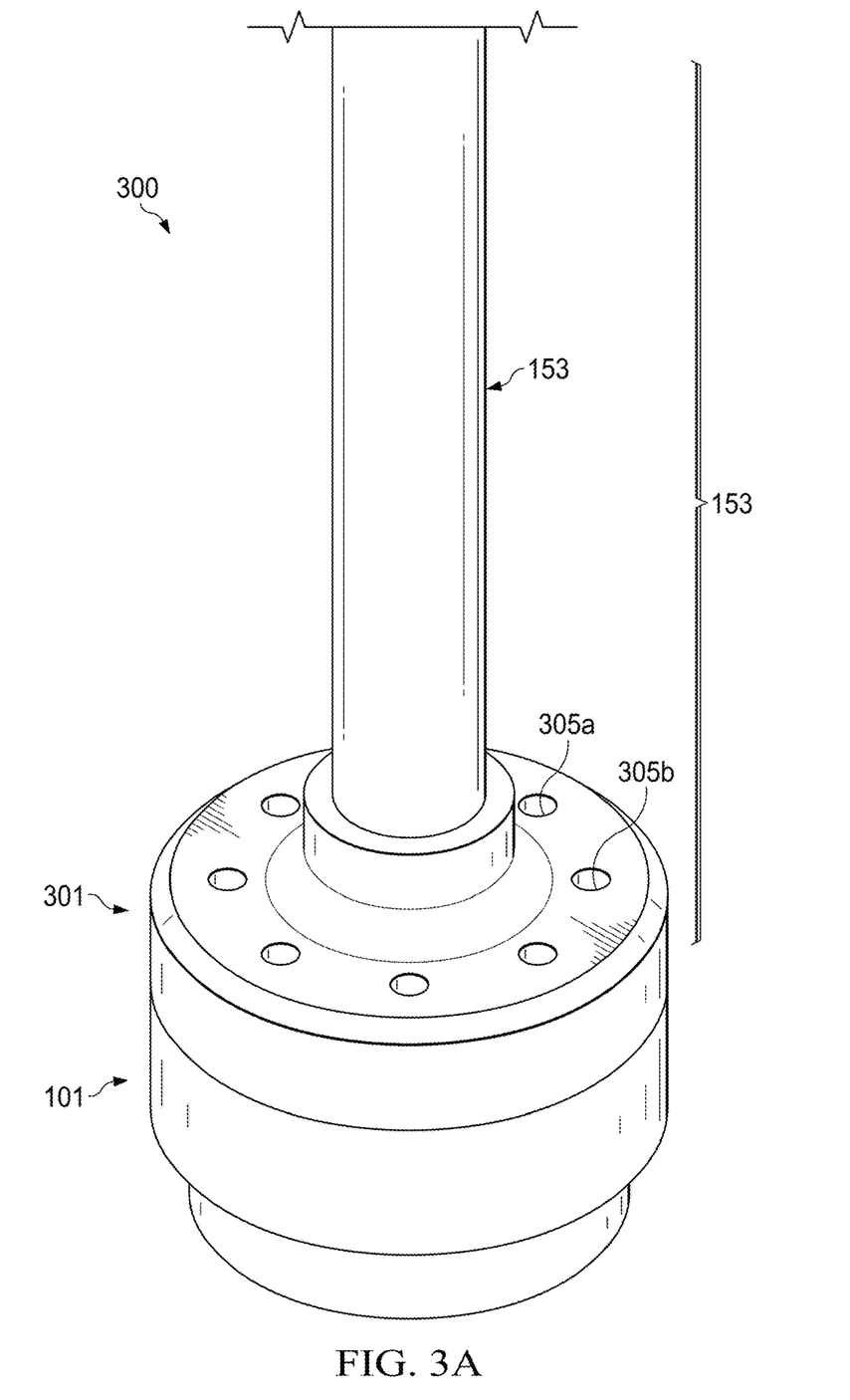
FIGS. 3A-3C illustrate an example of a sensor probe and lead cooling apparatus according to the present disclosure.
Figure 3B:
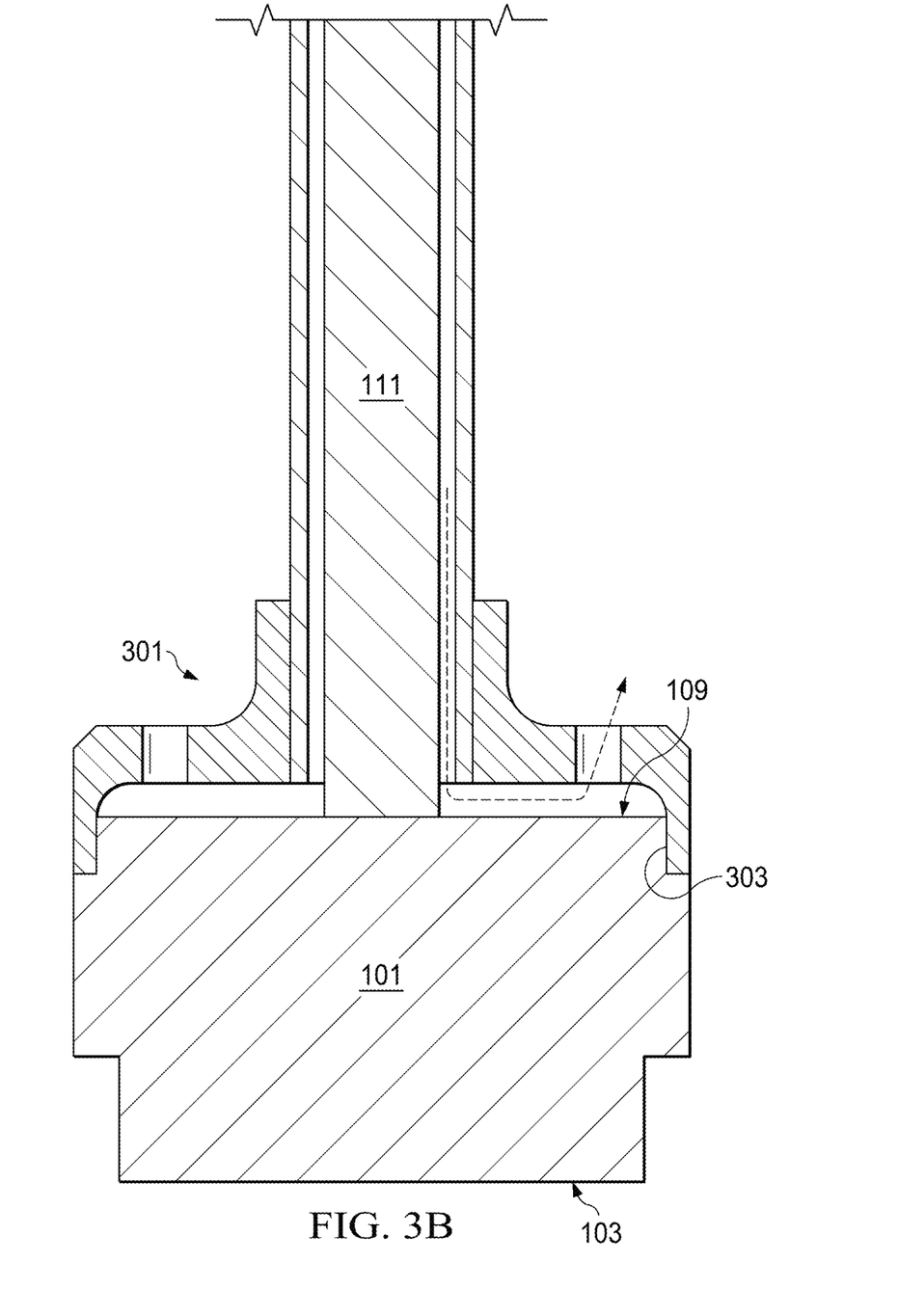
Figure 3C:
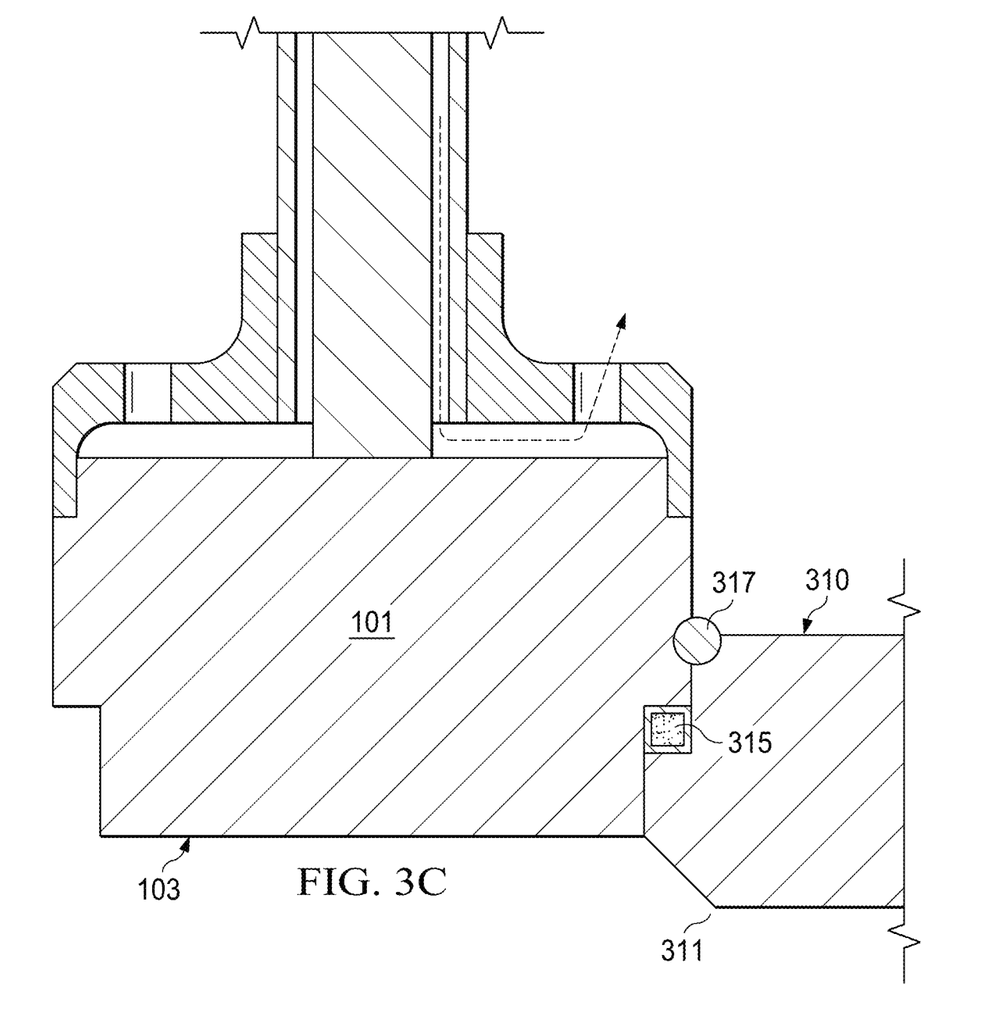

FIGS. 3A-3C illustrate another example apparatus 300 comprising a sensor probe and lead cooling assembly according to the present disclosure. For consistency and convenience of cross-reference, elements shown in FIGS. 3A-3B already described in the preceding figures are numbered similarly.

Referring to the illustrative example of FIGS. 3A-3C, apparatus 300 includes a back-mounted configuration of probe lead 111 relative to probe body 101, wherein, instead of joining probe body 101 on a sidewall of a cylindrically-shaped probe, probe lead 111 connects to probe body 101 at or around backside 109. As illustrated in FIGS. 3A-3C, collar 161 can be made integral with a backside cover 301. According to embodiments, backside cover 301 includes a stamped, cast, or milled section of a heat resistant material (such as a nickel steel). Depending on the profile of probe backside 109, backside cover 301 can be either tack welded at its periphery to backside 109 of probe body 101, with the interstitial gaps between tack welds serving as exit ports for the egress of gaseous coolant. Alternatively or additionally, probe backside 109 may include a peripheral rabbet 303 or other milled contour configured to interface with backside cover 301. As shown in the figures, as an alternative to, or in addition to, exit ports formed by gaps between the tack welds attaching backside cover 301 to probe body, backside cover 301 can include one or more backside exit ports (such as backside exit ports 305A and 305B.

As shown in FIGS. 3A through 3C, in certain embodiments, in top-mount configurations, collar 161 in FIGS. 1A-2B can be made integral with backside cover 301, such that cooling jacket 153 attaches directly to backside cover 301.

Skilled artisans will appreciate that heat management of blade tip clearance probes and other components in a high-temperature environment is a two-sided coin, including, on one hand, rejecting heat absorbed by the component, and on the other, minimizing the heat passed to the component. In addition to rejecting admitting heat by providing a cooling flow of gaseous coolant, embodiments according to this disclosure can also attend to the latter mode of heat management by minimizing the conductive flow of heat from BOAS 310 to probe body 101 and probe lead 111 by eliminating direct, thermally conductive contact between probe body 101 and BOAS 310 through the use of a thermal spacer 315 disposed in a gap between probe body 101 and BOAS 310. According to some embodiments, thermal spacer 315 includes a section of a ceramic (such as an alumina-borica-silica fiber) insulating material disposed around the periphery of probe body 101 and filling the gap between probe body 101 and BOAS 310. In this way, there is no direct contact between probe body 101 and hot side 311 of BOAS 310, and probe body 101 is only connected to BOAS 310 indirectly, via thermal spacer 315 and one or more tack welds 317.

Figure 4A:
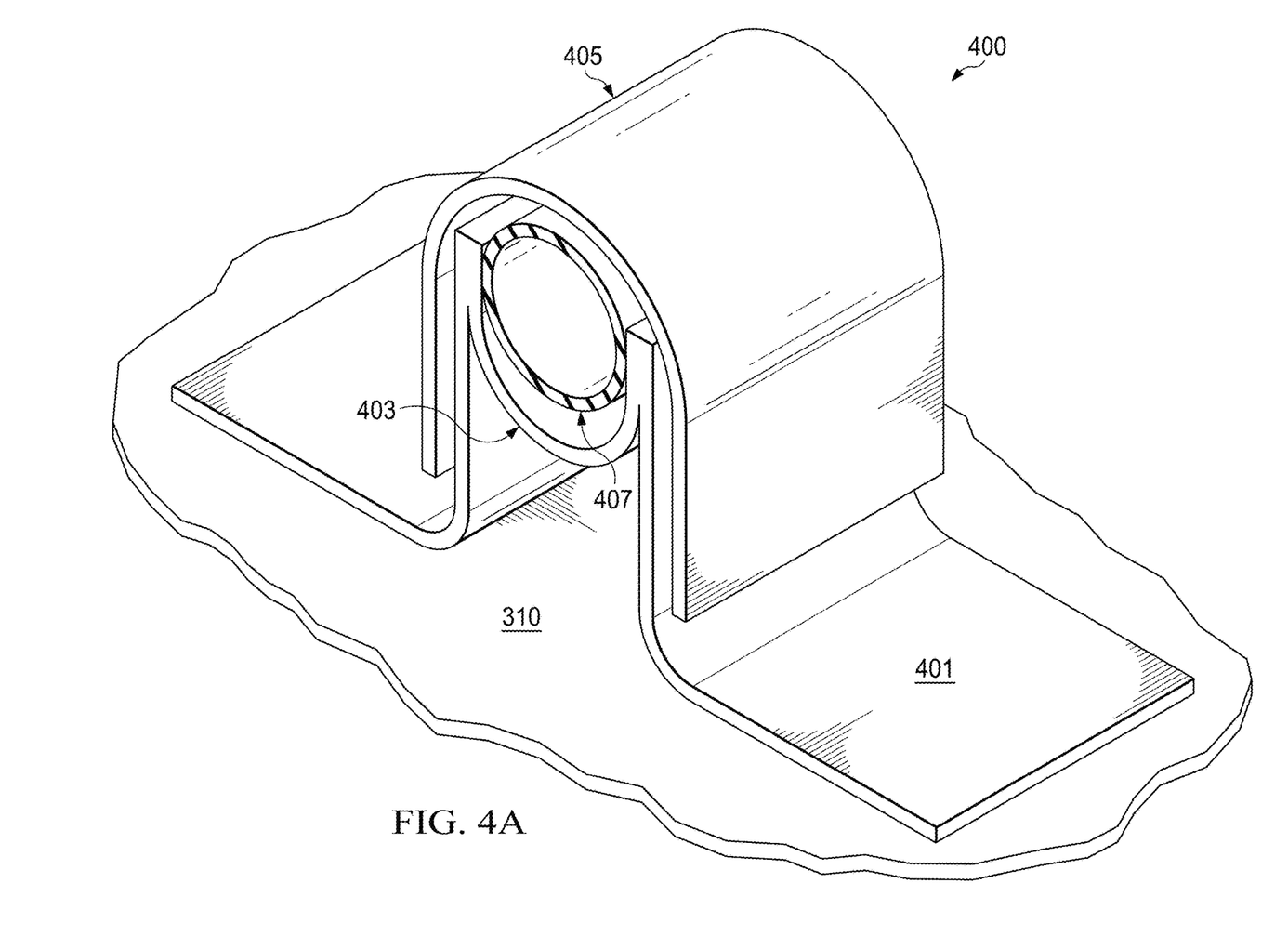
FIGS. 4A-4B illustrate an insulated offset collar assembly according to embodiments of this disclosure.
Figure 4B:
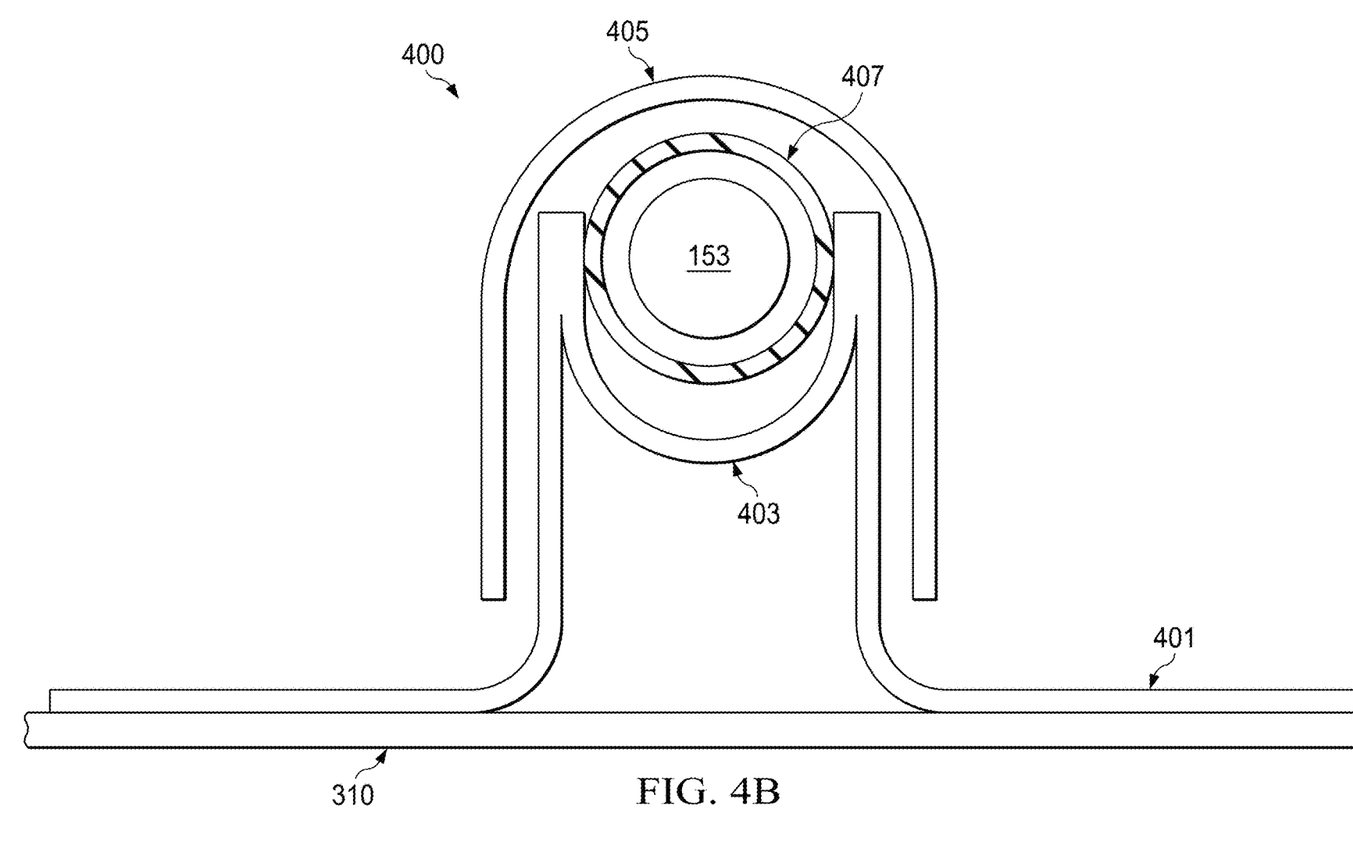

FIGS. 4A-4B illustrate an insulated offset collar assembly 400 according to embodiments of this disclosure. For consistency and convenience of cross-reference, elements shown in FIGS. 4A-4B described elsewhere in this disclosure are numbered similarly.

As noted elsewhere in this disclosure, areas in which one or more of probe body 101, probe lead 111 or cooling sleeve assembly 151 are in direct contact with hotter parts of the engine space present heightened risks of thermal damage to either probe lead 111 or probe body 101. Further, given the need to avoid movement of probe lead 111 within the spaces behind the BOAS, probe lead 111 needs to be secured within the space. Traditionally, probe leads have been retained using tack welded straps attached to anchor points protruding up from the back of the BOAS. While this approach reliably secures probe lead 111 and prevents it from rattling or otherwise moving during flight, because the anchor point assembly is attached to the back of the BOAS, heat from the combustor stage is conducted through the BOAS, to the anchor point and on to cooling sleeve assembly 151 and/or probe lead 111, creating "hot spots" in probe lead 111 and/or cooling sleeve assembly 151.

To reduce the conductive transfer of heat from BOAS to probe lead 111 and cooling sleeve assembly 151, offset collar assembly 400, like thermal spacer 315, provides an insulating break in the conductive path between BOAS 310 and cooling jacket 153. As shown in the figures, offset collar assembly 400 includes a rail 401, which can be a section of metal bent to define a saddle region 403 and attached (such as by welding or brazing) to BOAS 310. Offset collar assembly 400 can further include a tack strap 405, which, in conjunction with saddle region 403 defines a cylindrical aperture in which cooling sleeve assembly 151. Because rail 401 is connected to BOAS 310, it provides a conductive pathway for heat from the combustor stage, through the BOAS to cooling sleeve assembly 151. To interrupt this conductive pathway, offset collar assembly 400 includes an insulated offset collar 407, through which cooling jacket 153 passes. In this way, cooling jacket 153 is not in direct contact with either rail 401 or tack strap 405. Insulated offset collar can be made from any insulating material capable of withstanding temperatures above ~1500°, including, without limitation, ceramic insulators suitable for use as thermal spacer 315.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A lead cooling assembly comprising:
    a cooling jacket comprising a tubular section having an exterior portion and an interior portion, wherein the interior portion is proportioned to surround a probe lead and provide space for a flow of a gaseous coolant;
    an intake configured to admit the gaseous coolant into the interior portion of the cooling jacket;
    a collar configured to fit over the exterior portion of the cooling jacket, wherein the collar includes one or more exit holes configured to pass the gaseous coolant out of the interior portion of the cooling jacket; and
    a backside cover,
    wherein the backside cover attaches to a backside of a probe body to define a cooling chamber between the backside cover and the backside of the probe body,
    wherein the gaseous coolant enters the cooling chamber from the one or more exit holes in the collar, and
    wherein the gaseous coolant exits the cooling chamber via one or more exit ports.

2. The lead cooling assembly of claim 1, wherein the gaseous coolant comprises at least one of compressed air or gaseous nitrogen.

3. The lead cooling assembly of claim 1, wherein the collar attaches to the probe body by one or more of a brazed joint or a tack weld.

4. The lead cooling assembly of claim 1, wherein the collar is configured to attach to the probe lead, and wherein the probe lead is mounted to a sidewall of the probe body.

5. The lead cooling assembly of claim 1, wherein the collar is configured to attach to the probe lead, and wherein the probe lead is mounted to the backside cover of the probe body.

6. The lead cooling assembly of claim 1, further comprising an insulated offset collar surrounding a section of the exterior portion of the cooling jacket,
    wherein the insulated offset collar prevents one or more of a blade outer air seal (BOAS) rail or tack strap attached to a BOAS rail from directly contacting the cooling jacket.

7. The lead cooling assembly of claim 1, wherein the exit ports comprise gaps between tack welds attaching the backside cover to the backside of the probe body.

8. The lead cooling assembly of claim 7, further comprising a thermal spacer configured to surround a portion of the probe body and reduce contact between the probe body and a blade outer air seal (BOAS).

9. The lead cooling assembly of claim 1, wherein:
    the collar is integral with the backside cover; and
    the exit ports comprise holes formed in the backside cover.

10. An apparatus comprising:
    a sensor comprising a probe body and a probe lead connected to the probe body and configured to pass a signal generated in the probe body;
    a cooling jacket comprising a tubular section having an exterior portion and an interior portion, wherein the interior portion surrounds the probe lead and provides space for a flow of a gaseous coolant;
    an intake configured to admit the gaseous coolant into the interior portion of the cooling jacket;
    a collar configured to fit over the exterior portion of the cooling jacket and connect to the probe body, wherein the collar includes one or more exit holes configured to pass the gaseous coolant out of the interior portion of the cooling jacket; and
    a backside cover,
    wherein the backside cover attaches to a backside of the probe body to define a cooling chamber between the backside cover and the backside of the probe body,
    wherein the gaseous coolant enters the cooling chamber from the one or more exit holes in the collar, and
    wherein the gaseous coolant exits the cooling chamber via one or more exit ports.

11. The apparatus of claim 10, wherein the gaseous coolant comprises at least one of compressed air or gaseous nitrogen.

12. The apparatus of claim 10, wherein the collar attaches to the probe body by one or more of a brazed joint or a tack weld.

13. The apparatus of claim 10, wherein the collar is configured to attach to the probe lead, and wherein the probe lead is mounted to a sidewall of the probe body.

14. The apparatus of claim 10, wherein the collar is configured to attach to the probe lead, and wherein the probe lead is mounted to the backside cover of the probe body.

15. The apparatus of claim 10, further comprising an insulated offset collar surrounding a section of the exterior portion of the cooling jacket,
    wherein the insulated offset collar prevents one or more of a blade outer air seal (BOAS) rail or tack strap attached to a BOAS rail from directly contacting the cooling jacket.

16. The apparatus of claim 10, wherein the exit ports comprise gaps between tack welds attaching the backside cover to the backside of the probe body.

17. The apparatus of claim 16, further comprising a thermal spacer configured to surround a portion of the probe body and reduce contact between the probe body and a blade outer air seal (BOAS).

18. The apparatus of claim 10, wherein:
the collar is integral with the backside cover; and
the exit ports comprise holes formed in the backside cover.

* * * * *